UNITED STATES PATENT OFFICE.

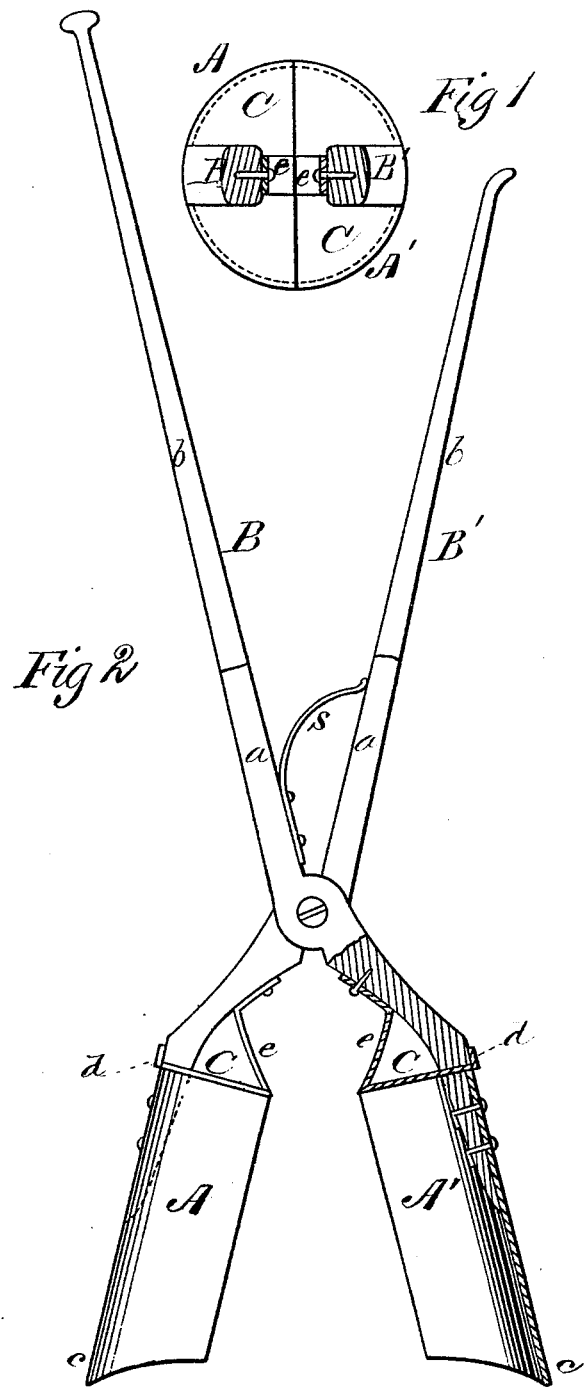

WILLIAM M. RYAN, OF MACOMB, ILLINOIS.

IMPROVEMENT IN TRANSPLANTERS AND POST-HOLE DIGGERS.

Specification forming part of Letters Patent No. 183,976, dated October 31, 1876; application filed July 29, 1876.

*To all whom it may concern:*

Be it known that I, WILLIAM M. RYAN, of Macomb, in the county of McDonough and State of Illinois, have invented a new and valuable Improvement in Transplanters and Post-Hole Diggers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a cross-sectional view of my improved implement, showing the packing-plates; and Fig. 2 is a side view of the same, showing the shovels open and one of them in section.

This invention has relation to improvements in post-hole diggers and transplanters; and it consists in the construction and novel arrangement, with the semi-cylindrical shovels and their handles, of the semicircular packing-plates, their fastening-tongues, and braces, as hereinafter fully shown and described.

In the annexed drawings, the letters A A' designate the shovels of my improved post-hole digger and transplanter, consisting, each, of a plate of sheet-steel bent or cast in semi-cylindrical shape, and forming, when put together, a complete cylinder. B B' represent the manipulating-handles, which are crossed and pivoted together after the manner of a smith's tongs, and will be riveted in any suitable manner to the upper edges of shovels A A', as shown in Fig. 2.

Handles B B' consist of lower metallic portions *a*, into which are socketed or otherwise secured the upper wooden portions *b*, the latter being used in order to protect the hands of the operator from the contact with metal in cold weather; but they may be made entirely of metal, if I so elect. Handle B will be somewhat longer than handle B', and the shovels will preferably have angular drive-points *c* at their cutting-edges.

The mode of operation is as follows: The operator seizes with one hand the longer handle, and grasps both with the other at a convenient point below, and forces the shovels together. He then strikes the shovels into the ground until the cylinder is filled. The implement is then drawn out of the earth and removed to one side, when, by releasing the handles, the shovels will be separated and their contents discharged, through the medium of a spring, *s*, included between the said handles above their joint.

When young plants are to be transplanted the operation is precisely the same, the plant, surrounded with the earth in which it had grown, being raised out of the earth and transferred to a previously-prepared hole.

In order to pack dry or sandy earth so as to prevent its running out of the shovels when they are raised out of the ground, I use, in connection with each of the shovels, a semicircular metallic or wooden plate, C, closing the upper ends thereof. These packer-plates will be removable, and will be each provided with a lug, *d*, projecting centrally from their curved edges, and extending through a slot made in each of the handles B B', just above the upper edge of the shovels, and their rectilinear contiguous edges will be sustained against upward displacement by means of sufficiently rigid braces *e*, secured at one end to the plates, and at the other to the handles B B', below their pivots. These plates, by closing one end of the cylinder formed by the shovels, will prevent the earth from escaping upward out of the shovels, and will cause it to become packed and hard therein, thus effectually preventing its running out of the digger.

In practice, the shovels will be sometimes provided with inside scrapers, connected, by means of rods, with the handles above in such a manner that when the shovels are separated the said scrapers will be forced down into the same, thus expelling sticky or wet earth and clay.

What I claim as new, and desire to secure by Letters Patent, is—

In combination with the shovels A A', their handles B B', and the packing-plates C C, the fastening tongues or lugs *d d* and braces *e e*, constructed and applied substantially as specified.

In testimony that I claim the above I have hereunto subscribed my name in the presence of two witnesses.

WILLIAM M. RYAN.

Witnesses:
R. H. BROADDUS,
R. D. WESTMAN.